United States Patent
Kaldobsky et al.

(10) Patent No.: US 11,919,367 B2
(45) Date of Patent: Mar. 5, 2024

(54) VEHICLE EXTERNAL HEATING

(71) Applicant: Ford Global Technologies, LLC, Dearborn, MI (US)

(72) Inventors: Tyler James-Ray Kaldobsky, Canton, MI (US); Daniel Sullivan, Grosse Pointe, MI (US); George Hart Vrampas, Southgate, MI (US); Brendan Jenkins, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 272 days.

(21) Appl. No.: 17/355,722

(22) Filed: Jun. 23, 2021

(65) Prior Publication Data

US 2022/0410659 A1     Dec. 29, 2022

(51) Int. Cl.
  *B60H 1/00*     (2006.01)
  *B60L 58/12*    (2019.01)
  *E05F 15/71*    (2015.01)
  *B60K 6/22*     (2007.10)
  *G01S 19/42*    (2010.01)

(52) U.S. Cl.
  CPC ..... *B60H 1/00878* (2013.01); *B60H 1/00735* (2013.01); *B60L 58/12* (2019.02); *E05F 15/71* (2015.01); *B60K 6/22* (2013.01); *B60Y 2200/91* (2013.01); *B60Y 2200/92* (2013.01); *E05Y 2400/44* (2013.01); *E05Y 2400/45* (2013.01); *E05Y 2900/55* (2013.01); *G01S 19/42* (2013.01)

(58) Field of Classification Search
  CPC ............ B60H 1/00878; B60H 1/00735; B60H 1/00771; B60H 1/00778; B60L 58/12; E05F 15/71; E05F 15/695; B60Y 2200/91; B60Y 2200/92; E05Y 2400/44; E05Y 2400/45; E05Y 2900/55; B60K 6/22

See application file for complete search history.

(56) References Cited

U.S. PATENT DOCUMENTS

| | | | |
|---|---|---|---|
| 10,546,441 B2* | 1/2020 | Joao ................... | G07C 9/00571 |
| 2014/0316630 A1* | 10/2014 | Kohlberger ............ | B60L 53/11 |
| | | | 701/22 |
| 2015/0129192 A1* | 5/2015 | Boss .................. | B60H 1/00878 |
| | | | 165/223 |
| 2017/0016266 A1* | 1/2017 | Van Wiemeersch ... | B60K 37/06 |
| 2020/0062080 A1* | 2/2020 | Hernandez ......... | B60H 1/00978 |
| 2020/0141174 A1* | 5/2020 | Herman ................ | B60L 53/305 |
| 2020/0148036 A1* | 5/2020 | Gaiser ...................... | B60H 1/22 |
| 2020/0269688 A1* | 8/2020 | Dagley .................... | H04W 4/44 |
| 2022/0272798 A1* | 8/2022 | Seo ....................... | H01Q 1/1278 |
| 2022/0371609 A1* | 11/2022 | Vollmann .............. | B60W 50/10 |

FOREIGN PATENT DOCUMENTS

| | | |
|---|---|---|
| CN | 204084688 U | 1/2015 |
| CN | 103029554 B | 6/2015 |
| KR | 101724568 B1 | 4/2017 |

* cited by examiner

*Primary Examiner* — Mussa A Shaawat
(74) *Attorney, Agent, or Firm* — Frank Lollo; Bejin Bieneman PLC

(57) ABSTRACT

A computer includes a processor and a memory storing instructions executable by the processor to receive data indicating that an electric vehicle is in an enclosed space; in response to receiving the data, instruct window actuators of the electric vehicle to open windows of the electric vehicle; and in response to receiving the data, instruct a heater of the electric vehicle to generate heat.

19 Claims, 3 Drawing Sheets

VEHICLE EXTERNAL HEATING

BACKGROUND

A climate-control system provides heating and/or cooling to a passenger cabin of a vehicle. The climate-control system typically includes a compressor, a condenser, a receiver-dryer, a thermal-expansion valve, an evaporator, blowers, fans, ducts, vents, vanes, and temperature sensors for the passenger cabin. The climate-control system operates to cool the passenger cabin by transporting a refrigerant through a heat cycle to absorb heat from the passenger cabin and expel the heat from the vehicle, as is known. The climate-control system typically includes a heater core that operates as a radiator for an internal-combustion engine of the vehicle by transferring some waste heat from the engine into the passenger cabin. The climate-control system can include an electrically powered heater such as a resistive heater, positive-temperature-coefficient heater, electrically power heat pump, etc.

DETAILED DESCRIPTION

Figure 1:
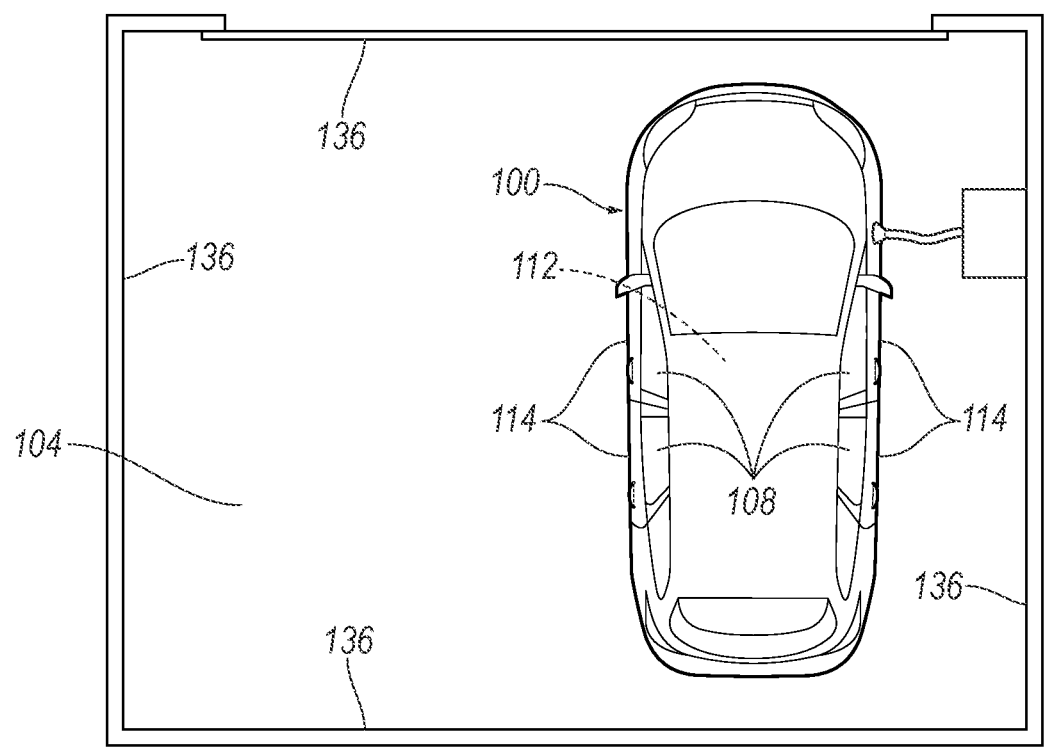
FIG. 1 is a top view of an example electric vehicle in an example enclosed space.

The systems and methods described herein provide techniques for using an electric vehicle for heating an enclosed space that is external to the vehicle. The vehicle can automatically prepare the enclosed space before the arrival of a user by opening windows of the vehicle and generating heat with a heater of the vehicle so that the enclosed space is comfortable when the user arrives. The vehicle performs the actions upon receiving data indicating that the vehicle is in the enclosed space, so the vehicle does not waste energy operating the heater in an open area where the heat would dissipate. Because the vehicle is an electric vehicle, operating the heater does not produce dangerous gases in the enclosed space.

A computer includes a processor and a memory storing instructions executable by the processor to receive data indicating that an electric vehicle is in an enclosed space; in response to receiving the data, instruct window actuators of the electric vehicle to open windows of the vehicle; and in response to receiving the data, instruct a heater of the electric vehicle to generate heat.

The instructions may further include instructions to receive a target time, and instruct the heater to generate heat based on the target time. The instructions may further include instructions to determine a start time based on the target time, and instructing the heater to generate heat may include activating the heater at the start time. Determining the start time may be based on previously operating the heater at a current location of the electric vehicle.

Determining the start time may be based on sensor data indicating locations of walls surrounding the electric vehicle.

Determining the start time may be based on an ambient temperature.

The instructions may further include instructions to refrain from instructing the heater to generate heat before the start time.

The data indicating that the electric vehicle is in the enclosed space may include GPS data indicating that the electric vehicle is at a preset location.

The data indicating that the electric vehicle is in the enclosed space may include sensor data indicating a presence of walls surrounding the electric vehicle.

The instructions may further include instructions to receive a target temperature, and instructing the heater to generate heat may include heating the enclosed space to the target temperature. The instructions may further include instructions to receive an ambient temperature from an ambient-temperature sensor, and heating the enclosed space to the target temperature may be based on the ambient temperature.

The instructions may further include instructions to deactivate the heater at an end time. The instructions may further include instructions to receive the end time as an input.

The instructions may further include instructions to determine the end time as a preset duration of operating the heater.

The instructions may further include instructions to, in response to receiving data indicating that the electric vehicle is not plugged in, refrain from instructing the heater to generate heat. The instructions may further include instructions to, while the electric vehicle is plugged in and the heater is generating heat, prevent a battery system from drawing down charge.

The instructions may further include instructions to, in response to receiving data indicating that a charge of a battery system of the electric vehicle is below a threshold charge, refrain from instructing the heater to generate heat.

The instructions may further include instructions to receive an input selecting a condition from a first condition and a second condition, the first condition being that the electric vehicle is not plugged in, the second condition being that a charge of a battery system of the electric vehicle is below a threshold charge; and in response to receiving data indicating the selected condition, refrain from instructing the heater to generate heat.

The instructions may further include instructions to, in response to instructing the heater to generate heat, deactivate a propulsion of the electric vehicle.

A method includes receiving data indicating that an electric vehicle is in an enclosed space; in response to receiving the data, instructing window actuators of the electric vehicle to open windows of the vehicle; and in response to receiving the data, instructing a heater of the electric vehicle to generate heat.

With reference to the Figures, wherein like numerals indicate like parts throughout the several views, a computer 102 includes a processor and a memory storing instructions executable by the processor to receive data indicating that an electric vehicle 100 is in an enclosed space 104; in response to receiving the data, instruct window actuators 106 of the vehicle 100 to open windows 108 of the vehicle 100; and in response to receiving the data, instruct a heater 110 of the vehicle 100 to generate heat.

With reference to FIG. 1, the vehicle 100 may be any suitable type of ground vehicle, e.g., a passenger or commercial automobile such as a sedan, a coupe, a truck, a sport utility, a crossover, a van, a minivan, a taxi, a bus, etc.

The vehicle 100 includes a passenger cabin 112 to house occupants, if any, of the vehicle 100. The passenger cabin 112 can include, e.g., seats for occupants of the vehicle 100. The passenger cabin 112 can be enclosed by the vehicle 100 when doors 114 and the windows 108 of the vehicle 100 are closed.

The windows 108 are movable via the window actuators 106 (shown in FIG. 2) between an open position and a closed position. The windows 108 in the closed position can be fully raised, and the windows 108 in the open position can be fully lowered, e.g., at least partially inside the respective doors 114. The windows 108 may be formed of any suitably durable transparent material, including glass such as laminated, tempered glass or plastic such as Plexiglas® or polycarbonate.

The vehicle 100 is an electric vehicle. The vehicle 100 can include a battery system 116 (shown in FIG. 2), which provides energy for operating the vehicle 100. The battery system 116 is rechargeable by electrically connecting to an external source 118 of energy, e.g., plugging into a charging station or wall outlet. For example, FIG. 1 depicts the vehicle 100 in a garage equipped with a home charging station to which the vehicle 100 is plugged in.

Figure 2:
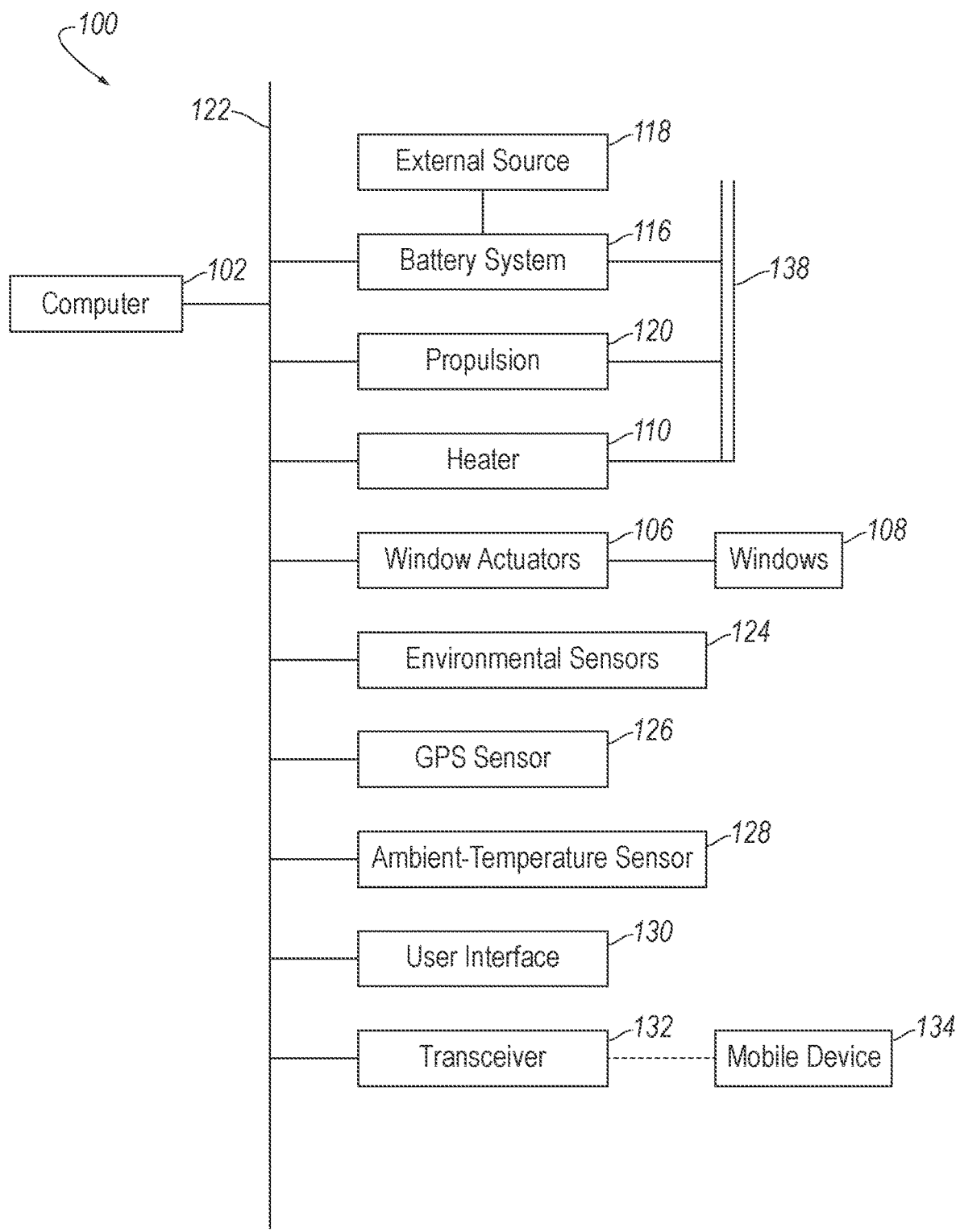
FIG. 2 is a block diagram of the electric vehicle.

With reference to FIG. 2, the battery system 116 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs). The battery system 116 can include a battery tray and at least one battery module fixed to the battery tray. For example, the battery system 116 may include four battery modules. In examples including multiple battery modules, adjacent ones of the battery modules can be connected to each other. Each battery module may include one or more battery cells. The battery tray may include a battery compartment that receives the battery modules. The battery system 116 may include any suitable hardware, e.g., wiring, connectors, circuits, etc., connecting the battery modules to each other and to electrified components of the vehicle 100. For example, the vehicle 100 can include a power bus 138 providing power from the battery system 116 to the heater 110 and to a propulsion 120.

The propulsion 120 of the vehicle 100 generates energy and translates the energy into motion of the vehicle 100. The propulsion 120 may be an electric powertrain including the battery system 116, an electric motor, and a transmission that transfers rotational motion to the wheels. The propulsion 120 can include an electronic control unit (ECU) or the like that is in communication with and receives input from the computer 102 and/or a human operator. The human operator may control the propulsion 120 via, e.g., an accelerator pedal and/or a gear-shift lever.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers 102 coupled together, e.g., by a communications network 122.

The computer 102 may transmit and receive data through the communications network 122 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the battery system 116, the propulsion 120, the heater 110, the window actuators 106, environmental sensors 124, a GPS sensor 126, an ambient-temperature sensor 128, a user interface 130, a transceiver 132, and other components via the communications network 122.

The heater 110 is an electrically powered heater such as a resistive heater, positive-temperature-coefficient heater, electrically power heat pump, etc. The heater 110 is positioned to output heat to the passenger cabin 112 of the vehicle 100, e.g., as part of a climate-control system.

The window actuators 106 can be any suitable type for raising and lowering the windows 108. For example, the window actuators 106 can be a conventional window regulator assembly including a bracket holding the respective window 108, a track along which the bracket can slide, a cable attached to the bracket, and an electric motor coupled to the cable and operable to pull the bracket up or down via the cable.

The environmental sensors 124 can be arranged for detecting the physical environment external to the vehicle 100. The environmental sensors 124 can be any suitable type for detecting objects spaced from the vehicle 100, e.g., radar sensors, scanning laser range finders, light detection and ranging (LIDAR) devices, and image processing sensors such as cameras.

The GPS sensor 126 can receive data from GPS satellites. The Global Positioning System (GPS) is a global navigation satellite system. The satellites broadcast time and geolocation data. The GPS sensor 126 can determine a location of the vehicle 100, i.e., latitude and longitude, based on receiving the time and geolocation data from multiple satellites simultaneously.

The ambient-temperature sensor 128 can detect a temperature of a surrounding environment or an object in contact with the ambient-temperature sensor 128 that is in thermal equilibrium with the surrounding environment. The ambient-temperature sensor 128 may be any device that generates an output correlated with temperature, e.g., a thermometer, a bimetallic strip, a thermistor, a thermocouple, a resistance thermometer, a silicon bandgap temperature sensor, etc. The ambient-temperature sensor 128 can be positioned to be sensitive to the temperature of the ambient environment, i.e., an air temperature outside the vehicle 100.

The user interface 130 can present information to and receives information from the user of the vehicle 100. The user interface 130 may be located, e.g., on an instrument panel in the passenger cabin 112 of the vehicle 100, or wherever may be readily seen by the user. The user interface 130 may include dials, digital readouts, screens, speakers, and so on for providing information to the user, e.g., human-machine interface (HMI) elements such as are known. The user interface 130 may include buttons, knobs, keypads, microphone, and so on for receiving information from the user.

The transceiver 132 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 132 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device 134 associated with the owner of the vehicle 100, etc. The transceiver 132 may be one device or may include a separate transmitter and receiver.

The mobile device 134 is a portable computing device such as a mobile phone, e.g., a smartphone, or a tablet. The mobile device 134 can be a computing device including a processor and a memory. The mobile device 134 can be owned and carried by the user, who may be the operator or owner of the vehicle 100.

Returning to FIG. 1, the vehicle 100 is configured to heat the enclosed space 104 when the vehicle 100 is parked in the enclosed space 104. The enclosed space 104 is a structure that surrounds the vehicle 100, e.g., above and to the front, back, and sides. For example, as shown in FIG. 1, the enclosed space 104 is a garage in which the vehicle 100 is parked. Because the enclosed space 104 is enclosed, heat can be prevented from flowing out of the enclosed space 104 by bulk motion of the air through open areas.

The vehicle 100 can heat the enclosed space 104 in response to the computer 102 receiving data indicating that the vehicle 100 is in the enclosed space 104. For example, the data can include GPS data from the GPS sensor 126 indicating that the vehicle 100 is at a preset location. The preset location can be an input by the user of a location that is known to be in an enclosed space 104. For example, when the vehicle 100 is parked in the enclosed space 104 such as a garage of the user, the user can use the user interface 130 or the mobile device 134 to set a current location as the preset location. The computer 102 can store the preset location in memory. The computer 102 can store multiple preset locations.

For another example, the data can be sensor data from the environmental sensors 124 indicating a presence of walls 136 surrounding the vehicle 100. For example, the environmental sensors 124 can include a front radar sensor, a rear radar sensor, and lateral radar sensors, and radar data from the radar sensors is all within a threshold distance. The threshold distance can be chosen to be, e.g., greater than a longest distance within a typical garage. For another example, the environmental sensors 124 can include cameras, and image data from the cameras show flat panels extending horizontally around the vehicle 100, i.e., without a gap. The image data can be processed using, e.g., image segmentation as is known in order to identify the flat panels.

The vehicle 100 can heat the enclosed space 104 by opening the windows 108 and instructing the heater 110 to generate heat. The heater 110 is typically used for heating the passenger cabin 112, and the heated air exhausted into the passenger cabin 112 by the heater 110 can flow out the open windows 108 into the enclosed space 104, thereby heating the enclosed space 104. As a result, the user can use the enclosed space 104 comfortably even if the enclosed space 104 has no climate control of its own and weather conditions are cold, e.g., an unheated garage in winter.

The heating of the enclosed space 104 can be controlled by settings inputted to the computer 102 by the user, e.g., via the user interface 130 or the mobile device 134. For example, the user can input a target temperature. The computer 102 can instruct the heater 110 to heat the enclosed space 104 to the target temperature and to turn off and on to keep the enclosed space 104 within a preset margin, e.g., 2°, of the target temperature, e.g., turning off when the ambient temperature reaches 2° above the target temperature and turning on when the ambient temperature reaches 2° below the target temperature.

For another example of settings inputted by the user, the user can input a target time, i.e., a time by which to reach the target temperature, which may be a time at which the user will arrive at the enclosed space 104. The computer 102 can determine a start time at which to begin generating heat with the heater 110 using the target time. The start time can be based on, e.g., the ambient temperature received from the ambient-temperature sensor 128, historical data from heating the enclosed space 104 at a current location of the vehicle 100, and/or sensor data from the environmental sensors 124 indicating locations of the walls 136 surrounding the vehicle 100. For example, the computer 102 can use the ambient temperature, the target temperature, and a rate at which the ambient temperature rose when previously operating the heater 110 at the current location of the vehicle 100, e.g., $t=(T_t-T_a)/R$, in which t is a heating duration, $T_t$ is the target temperature, $T_a$ is the ambient temperature, and R is the historical rate of the ambient temperature rising, e.g., in degrees per hour. The start time is then the target time minus the heating duration t. For another example, the computer 102 can use the ambient temperature, the target temperature, and the locations of the walls 136 surrounding the vehicle 100, e.g., $t=(T_t-T_a)/R(V)$, in which V is a volume of the enclosed space 104 and R(V) is the rate of the ambient temperature rising as a function of the volume V. The volume V can be a horizontal area encompassed by the walls 136 multiplied by a height of the ceiling, which can be known from the sensor data from the environmental sensors 124 or assumed as a typical height of a ceiling, e.g., 10 feet. The function R(V) can be based on known thermodynamic models.

For another example of settings inputted by the user, the user can input a condition for not operating the heater 110. In other words, if the condition is met, the computer 102 refrains from instructing the heater 110 to generate heat. For example, the user can provide an input selecting a condition from a first condition and a second condition, in which the first condition is that the vehicle 100 is not plugged in to the external source 118 and the second condition is that a charge of the battery system 116 is below a threshold charge. The first condition, in other words, is that the vehicle 100 has no external source 118 of energy and thus would draw down the charge of the battery system 116 in order to operate the heater 110. If the user selects the first condition, the vehicle 100 will keep the battery system 116 at a current charge rather than draw down power for operating the heater 110. The second condition permits the charge of the battery system 116 to be drawn down for operating the heater 110 until the charge reaches the charge threshold. The charge threshold can be chosen to permit the vehicle 100 to travel to a charging station. Thus, the user can select whether to keep the vehicle 100 fully charged rather than instruct the heater 110 to generate heat, i.e., the first condition, or draw down the battery system 116 in order to power the heater 110, i.e., the second condition.

For another example of settings inputted by the user, the user can input an end time for operating the heater 110, i.e., a time at which the computer 102 will turn off the heater 110 and cease operating the heater 110. For example, the user can input the end time as a duration for operating the heater 110 or as a time of day. In the case of the duration, the end time can be the start time plus the duration or the target time plus the duration. The user can select the end time up to a preset duration. The preset duration can be chosen to prevent overuse of the heater 110 that can reduce a lifespan of the heater 110. Alternatively to receiving the end time as an input, the end time can be the preset duration after the start time or target time.

Figure 3:
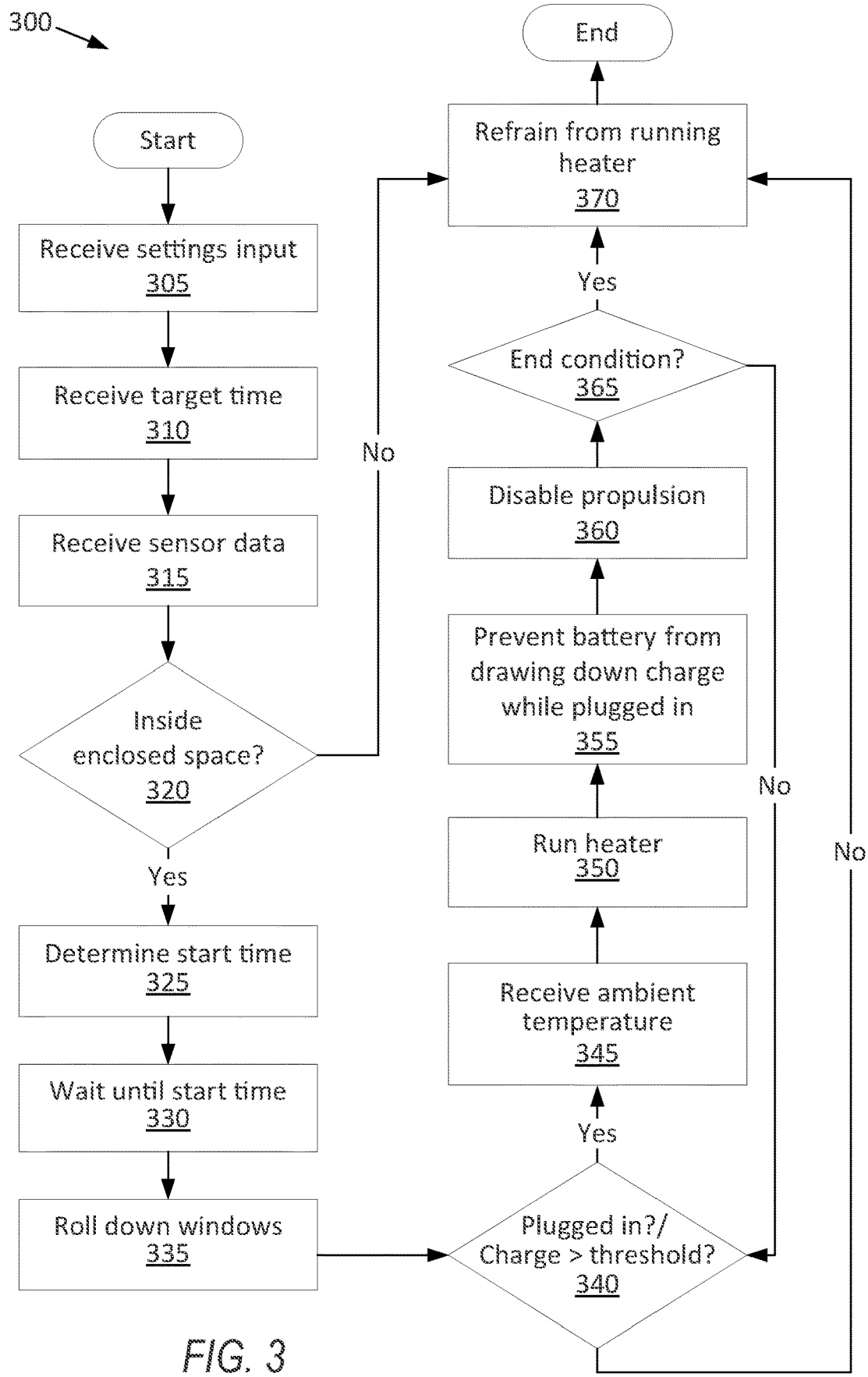
FIG. 3 is a process flow diagram of an example process for heating the enclosed space with the electric vehicle.

FIG. 3 is a process flow diagram illustrating an exemplary process 300 for heating the enclosed space 104 with the vehicle 100. The memory of the computer 102 stores executable instructions for performing the steps of the process 300 and/or programming can be implemented in structures such as mentioned above. The process 300 can be performed while the vehicle 100 is off or on. Alternatively, the process 300 can be performed only when the vehicle 100 is off.

As a general overview of the process 300, the computer 102 receives settings input and sensor data. In response to receiving data indicating that the vehicle 100 is in the enclosed space 104, the computer 102 determines the start time and, at the start time, rolls down the windows 108. If the condition selected by the user for refraining from operating the heater 110 is not met, the computer 102 instructs the heater 110 to generate heat until an end condition is met. While the heater 110 is operating, the computer 102 disables the propulsion 120. If the vehicle 100 is not in the enclosed space 104, if the condition selected by the user is met, or if the end condition occurs, the computer 102 refrains from instructing the heater 110 to generate heat.

The process 300 begins in a block 305, in which the computer 102 receives settings inputs for operating the heater 110 including the target temperature, the end time, and the selected condition from the first and second conditions described above. These settings can be inputted by the user once and then used for subsequent times that the user wants to generate heat with the heater 110. The user can also change any of the settings when choosing to operate the heater 110.

Next, in a block 310, the computer 102 receives an input of the target time. The target time can be inputted by the user each time that the user wants to generate heat with the heater 110. The user interface 130 or mobile device 134 can prompt the user for the target time when the user opens the functionality for operating the heater 110.

Next, in a block 315, the computer 102 receives sensor data from the environmental sensors 124, the GPS sensor 126, and the ambient-temperature sensor 128.

Next, in a decision block 320, the computer 102 determines whether the vehicle 100 is in the enclosed space 104 using the sensor data, as described above. In response to the data indicating that the vehicle 100 is in the enclosed space 104, the process 300 proceeds to a block 325. In response to the data failing to indicate that the vehicle 100 is in the enclosed space 104, the process 300 proceeds to a block 370.

In the block 325, the computer 102 determines the start time based on the target time, the ambient temperature, and either previously operating the heater 110 at the current location or the locations of the walls 136 surrounding the vehicle 100, as described above.

Next, in a block 330, the computer 102 waits until the start time. In other words, the computer 102 refrains from instructing the heater 110 to generate heat before the start time.

Next, in a block 335, the computer 102 instructs the window actuators 106 to open the windows 108, i.e., to move the windows 108 from the closed position to the open position.

Next, in a decision block 340, the computer 102 determines whether the selected condition is met, i.e., whichever of the first condition or the second condition was selected by the user in the block 305. If the user selected the first condition, the computer 102 can determine whether the vehicle 100 is plugged in to the external source 118. In response to data indicating that the vehicle 100 is plugged in, the process 300 proceeds to a block 345. In response to data indicating that the vehicle 100 is not plugged in, the process 300 proceeds to the block 370. If the user selected the second condition, the computer 102 can determine whether the charge of the battery system 116 is above the charge threshold. If the charge is above the charge threshold, the process 300 proceeds to the block 345. If the charge is at or below the charge threshold, the process 300 proceeds to the block 370.

In the block 345, the computer 102 receives the ambient temperature from the ambient-temperature sensor 128.

Next, in a block 350, the computer 102 instructs the heater 110 to generate heat. The computer 102 can instruct the heater 110 to generate heat based on the target time, in that the computer 102 activates the heater 110 at the start time determined from the target time and refrains from instructing the heater 110 to generate heat before the start time. The computer 102 can instruct the heater 110 to generate heat based on the target temperature and the ambient temperature, in that operating the heater 110 includes heating the enclosed space 104 to the target temperature, i.e., until the ambient temperature is at the target temperature. For example, as described above, the computer 102 can turn the heater 110 on and off to keep the ambient temperature within the preset margin of the target temperature.

Next, in a block 355, the computer 102 prevents the battery system 116 from drawing down charge while the vehicle 100 is plugged in and the heater 110 is operating. In other words, the heater 110 can draw power from the external source 118 rather than the battery system 116 if the external source 118 is available. The computer 102 can maintain the battery system 116 at a current charge or recharge the battery system 116 depending on whether the battery system 116 is fully charged and whether the external source 118 is providing sufficient power for both operating the heater 110 and recharging the battery. If the vehicle 100 is not plugged in, the computer 102 can permit the battery system 116 to draw down charge to power the heater 110.

Next, in a block 360, the computer 102 deactivates the propulsion 120 in response to instructing the heater 110 to generate heat. The propulsion 120 and the heater 110 can be on the same power bus 138 in the vehicle 100, so power available to the heater 110 may also available to the propulsion 120. Deactivating the propulsion 120 can prevent the user from accidentally moving the vehicle 100 inside the enclosed space 104.

Next, in a decision block 365, the computer 102 determines whether an end condition has occurred. For example, the computer 102 can determine whether the end time or the preset duration has elapsed. For another example, the computer 102 can determine that the user has inputted a command to cease operating the heater 110, e.g., via the user interface 130 or the mobile device 134. If an end condition has occurred, the process 300 proceeds to the block 370. If no end condition has occurred, the process 300 returns to the decision block 340 to continue generating heat with the heater 110.

In the block 370, the computer 102 refrains from instructing the heater 110 to generate heat. If the heater 110 is generating heat, the computer 102 can deactivate the heater 110. After the block 370, the process 300 ends.

Computer executable instructions may be compiled or interpreted from computer programs created using a variety of programming languages and/or technologies, including, without limitation, and either alone or in combination, Java, C, C++, Visual Basic, Java Script, Perl, HTML, etc. In general, a processor, e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive data indicating that an electric vehicle is inside an enclosed space;
   receive a target temperature;
   in response to receiving the data indicating that the electric vehicle is inside the enclosed space, instruct window actuators of the electric vehicle to open windows of the vehicle; and
   in response to receiving the data indicating that the electric vehicle is inside the enclosed space, instruct a heater of the electric vehicle to generate heat while the windows are open, wherein instructing the heater to generate heat includes heating the enclosed space outside the electric vehicle to the target temperature.

2. The computer of claim 1, wherein the instructions further include instructions to receive a target time, and instruct the heater to generate heat based on the target time.

3. The computer of claim 2, wherein the instructions further include instructions to determine a start time based on the target time, and instructing the heater to generate heat includes activating the heater at the start time.

4. The computer of claim 3, wherein determining the start time is based on previously operating the heater at a current location of the electric vehicle.

5. The computer of claim 3, wherein determining the start time is based on sensor data indicating locations of walls surrounding the electric vehicle.

6. The computer of claim 3, wherein determining the start time is based on an ambient temperature.

7. The computer of claim 3, wherein the instructions further include instructions to refrain from instructing the heater to generate heat before the start time.

8. The computer of claim 1, wherein the data indicating that the electric vehicle is in the enclosed space includes GPS data indicating that the electric vehicle is at a preset location.

9. The computer of claim 1, wherein the data indicating that the electric vehicle is in the enclosed space includes sensor data indicating a presence of walls surrounding the electric vehicle.

10. The computer of claim 1, wherein the instructions further include instructions to receive an ambient temperature from an ambient-temperature sensor, and heating the enclosed space to the target temperature is based on the ambient temperature.

11. The computer of claim 1, wherein the instructions further include instructions to deactivate the heater at an end time.

12. The computer of claim 11, wherein the instructions further include instructions to receive the end time as an input.

13. The computer of claim 11, wherein the instructions further include instructions to determine the end time as a preset duration of operating the heater.

14. The computer of claim 1, wherein the instructions further include instructions to, in response to receiving data indicating that the electric vehicle is not plugged in, refrain from instructing the heater to generate heat.

15. The computer of claim 14, wherein the instructions further include instructions to, while the electric vehicle is plugged in and the heater is generating heat, prevent a battery system from drawing down charge.

16. The computer of claim 1, wherein the instructions further include instructions to, in response to receiving data indicating that a charge of a battery system of the electric vehicle is below a threshold charge, refrain from instructing the heater to generate heat.

17. The computer of claim 1, wherein the instructions further include instructions to receive an input selecting a condition from a first condition and a second condition, the first condition being that the electric vehicle is not plugged in, the second condition being that a charge of a battery system of the electric vehicle is below a threshold charge; and in response to receiving data indicating the selected condition, refrain from instructing the heater to generate heat.

18. The computer of claim 1, wherein the instructions further include instructions to, in response to instructing the heater to generate heat, deactivate a propulsion of the electric vehicle.

19. A method comprising:
   receiving data indicating that an electric vehicle is inside an enclosed space;
   receiving a target temperature;
   in response to receiving the data indicating that the electric vehicle is inside the enclosed space, instructing window actuators of the electric vehicle to open windows of the vehicle; and in response to receiving the data indicating that the electric vehicle is inside the enclosed space, instructing a heater of the electric vehicle to generate heat while the windows are open, wherein instructing the heater to generate heat includes heating the enclosed space outside the electric vehicle to the target temperature.

\* \* \* \* \*